(12) United States Patent
Lagerwall et al.

(10) Patent No.: US 8,698,725 B2
(45) Date of Patent: Apr. 15, 2014

(54) LIQUID CRYSTAL DEVICE AND A METHOD FOR WRITING GREYSCALE

(76) Inventors: Sven T Lagerwall, Göteborg (SE); Per Rudquist, Göteborg (SE)

( * ) Notice: Subject to any disclaimer, the term of this patent is extended or adjusted under 35 U.S.C. 154(b) by 0 days.

(21) Appl. No.: 13/809,165

(22) PCT Filed: Jul. 8, 2011

(86) PCT No.: PCT/SE2011/050931
§ 371 (c)(1),
(2), (4) Date: Jan. 9, 2013

(87) PCT Pub. No.: WO2012/005681
PCT Pub. Date: Jan. 12, 2012

(65) Prior Publication Data
US 2013/0107150 A1    May 2, 2013

Related U.S. Application Data

(60) Provisional application No. 61/362,709, filed on Jul. 9, 2010.

(51) Int. Cl.
*G09G 3/36* (2006.01)

(52) U.S. Cl.
USPC .............................. 345/97; 345/89; 345/690

(58) Field of Classification Search
USPC ............. 345/87–97, 690–691, 694–696, 208, 345/210; 349/33–34, 96, 173–174
See application file for complete search history.

(56) References Cited

U.S. PATENT DOCUMENTS

| | | | |
|---|---|---|---|
| 5,459,481 A | 10/1995 | Tanaka et al. | |
| 5,897,189 A | 4/1999 | Sako et al. | |
| 5,922,242 A | 7/1999 | Saishu et al. | |
| 6,232,942 B1 * | 5/2001 | Imoto et al. | 345/97 |
| 6,888,527 B2 * | 5/2005 | Kondoh | 345/97 |
| 2002/0075445 A1 | 6/2002 | Dabrowski et al. | |
| 2003/0122768 A1 * | 7/2003 | Oton et al. | 345/96 |
| 2008/0049175 A1 * | 2/2008 | Komitov et al. | 349/96 |

FOREIGN PATENT DOCUMENTS

| | | |
|---|---|---|
| JP | 5249438 A | 9/1993 |
| JP | 6095163 A | 4/1994 |
| JP | 6281953 A | 10/1994 |

OTHER PUBLICATIONS

International Search Report and Written Opinion issued in PCT/SE2011/050931 by Patent- och registreringsverket on Nov. 9, 2011.

* cited by examiner

*Primary Examiner* — Hong Zhou
(74) *Attorney, Agent, or Firm* — Valea AB

(57) ABSTRACT

Example embodiments presented herein may be directed towards an antiferroelectric liquid crystal (AFLC) device and a method for writing greyscale in the AFLC device. The device may comprise two electrode substrates confining an antiferroelectric liquid crystal (AFLC) material. The method may comprise driving the AFLC device with an electrical signal, where the electrical signal does not comprise a direct current holding voltage for a writing of at least a portion of written levels of grey. The method may also comprise inducing a greyscale configuration in the AFLC device as a function of the driving, wherein the inducing is temperature independent. The method may also comprise applying a high-frequency signal, to stabilize a well-defined horizontal tilt plane of the antiferroelectric or, in particular, of the orthoconic antiferroelectric. The examples embodiments presented herein provide for fast and precise writing of greyscales in orthoconic antiferroelectrics.

16 Claims, 7 Drawing Sheets

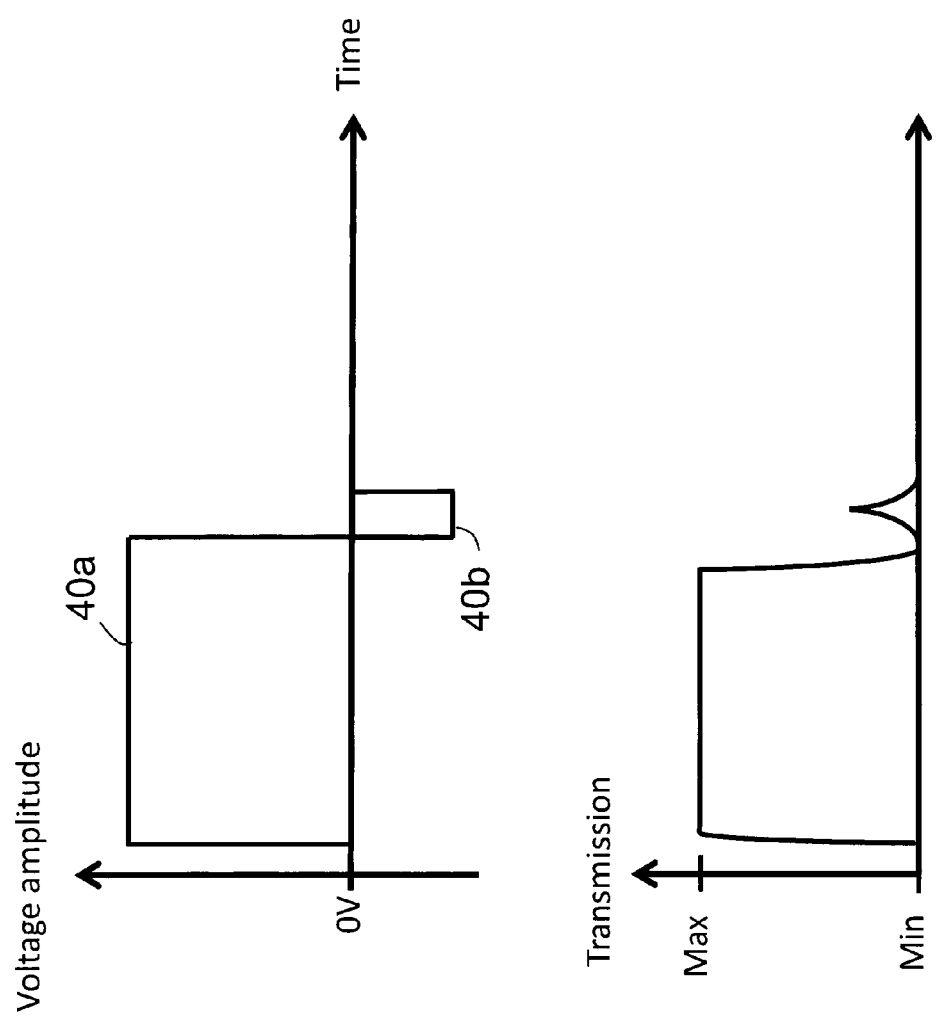

LIQUID CRYSTAL DEVICE AND A METHOD FOR WRITING GREYSCALE

RELATED APPLICATIONS

This application is a National Stage Entry under 35 U.S.C. §371 of International Application No. PCT/SE2011/050931, filed Jul. 8, 2011. The present application and the International application both claim the benefit of U.S. Provisional Application No. 61/362,709, filed on Jul. 9, 2010. The entire teachings of the above applications are incorporated herein by reference.

TECHNICAL FIELD

Example embodiments are presented herein which are directed to writing greyscale in antiferroelectric liquid crystal based devices. The writing of greyscale may be performed without the use of a DC holding voltage for a writing of at least a portion of written levels of grey.

BACKGROUND

Since they were first reported in 1989 Antiferroelectric Liquid Crystals (AFLCs) have been considered very attractive for a number of electro-optic applications, foremost for high-resolution large area displays. In antiferroelectric liquid crystal displays (AFLCDs) the smectic $C_a^*$ phase liquid crystal is ideally arranged in a bookshelf geometry, with the smectic layers aligned perpendicular to the cell plates as is illustrated in FIG. 1A. When being in the helix-free surface-stabilized state with the director tilt plane parallel to the cell plates (horizontal tilt plane, HAF configuration) and aligned in so-called bookshelf geometry AFLCs are optically biaxial with their slow principal axis along the smectic layer normal. This gives a dark state when the cell is between crossed polarizers oriented parallel and perpendicular to the layer normal.

When a sufficiently strong electric field ±E is applied across the cell, the anticlinic ground state, with an alternating electric polarization $P_s$ direction in adjacent smectic layers, is forced to one of the two symmetrically situated synclinic states with the slow axis inclined at ±θ away from the layer normal, as is illustrated in FIG. 1B. This is the so-called field-induced transition from the antiferroelectric (AF) to the ferroelectric (±F) state. The switching occurs in domains and greyscale can be produced by controlling the ratio of bright ferroelectric F domains to dark antiferroelectric AF domains. When the field is taken away the AFLC relaxes back to the AF state. The AFLC is thus monostable, in contrast to the surface-stabilized ferroelectric liquid crystal (SSFLC) which is bistable.

So far, the idea to use AFLC materials in a display mode has been in principle, to use three states of the optic axis lying in a plane, and use the hysteretic nature of the electrooptic switching between the AF and the F states. In particular, after the writing of a certain greylevel the application of a holding voltage for which both the AF and the F states are stable, have secured the written greylevel until the next state is to be written. This is the so-called tri-state switching. Small video and large desktop computer prototype AFLC displays have been presented already during the 1990's but they were never commercialized. The main reason for this was the insufficient extinction obtained in the dark state.

AFLC materials are notoriously difficult to align in a high-quality bookshelf structure. Instead AFLC materials typically form an inhomogeneous smectic layer structure with local variations in the slow axis (the effective optic axis) orientation in the cell. These variations in the optic axis orientation cause light leakage in the dark state. One part of the alignment problem is the lack of a nematic phase in AFLC materials. Another is the tendency for the structure to break up under electronic addressing conditions. In the latter situation, the vertical chevron formed at the virgin cooling from the smectic A* to the tilted $SmC_a^*$ (sometimes via SmC*) is straightened up by the electric field and the AFLC now instead forms a seemingly "horizontal chevron structure".

In an attempt to solve the "dark state" problem Orthoconic Antiferroelectric Liquid Crystals (OAFLC) have been developed. An OAFLC device features AFLC material which satisfies the orthoconic condition. In order to satisfy the orthoconic condition, two properties are typically met. The first is a material property where the tilt angle in the anticlinic AF structure is approximately 45°, such that the director n in adjacent smectic layers is perpendicular. The second is a device property where the AF structure is surface-stabilized such that no trace of the helix is present. This second condition is harder to realize in the AFLC than in the FLC case.

The result is that if these two conditions are satisfied the AFLC changes from positive biaxial to negative uniaxial and with the optic axis perpendicular to the director tilt plane and to the layer normal instead of being along the normal. Thus, the AFLC may be in an uniaxial negative state with an oblate indicatrix. This is called the orthoconic condition. Thus, the horizontally surface stabilized state (HAF) of orthoconic AFLCs has the optic axis perpendicular to the cell plates. The orthoconic darkstate is in principle just as good as the extinction of the polarizers, independent of alignment or misalignment, which is unique. Between crossed circular polarizers even the bright state is insensitive to alignment, which is equally unique.

So far, grey levels for display applications using AFLC materials have been produced by amplitude modulation using the symmetric hysteresis curve together with a holding voltage.

FIG. 3 is an example of greyscale writing through the use of amplitude modulation with a holding voltage. FIG. 3 illustrates a graphical representation of an applied voltage amplitude with respect to time for each of the four frames 16. FIG. 3 also illustrates a graphical representation of a resulting light transmission for each of the four frames with respect to time 18. FIG. 3 further illustrates examples of respective frame images resulting from the applied voltage 20.

Frame 2, of FIG. 3, is an example of a dark state. As shown, no voltage is applied, thereby resulting in limited or no transmission of light. Frame 3 is an example of a bright state. During a bright state, a constant voltage may be applied allowing for a sufficient transmission of light resulting in the bright state.

Frames 1 and 4 provide examples of greyscale images resulting from amplitude modulation. OAFLC or AFLC amplitude modulation may be provided by using a writing voltage 23 followed by a lower holding voltage 25 to accomplish grey levels with fractional anticlinic to clinic switching. As the applied writing voltage amplitudes for frame one are higher than the writing voltage amplitudes for frame four, the grey scale image of frame four is darker than that of frame one.

By varying the combination of the value of the writing and holding voltage amplitudes, the application time of the writing and holding voltage amplitudes, and/or the difference between the applied writing and holding voltage amplitudes, may other grey levels may be obtained Grey levels may also be produced by dividing at least one pixel into sub-pixels, as illustrated in FIG. 4. FIG. 4 illustrates an example OAFLC or AFLC display or cell 30 featuring 16 pixels. FIG. 4 further illustrates an example pixel 32, which may feature 3 sub-pixels 32a-32c. By varying the dark and bright states of each of the sub-pixels 32a-32c, vary grey levels may be provided. Such variation may be referred to herein as sub-pixel modulation.

Example pixel configurations 33a-33h are also illustrated in FIG. 4. FIG. 4, further illustrates resulting pixel images 35a-35h, corresponding to respective pixel configurations 33a-33h, which may be provided by varying the dark and bright states of the sub-pixels 32a-32c. Pixel configuration 33a features all three sub-pixels 32a-32c in a dark state, thus the resulting pixel image 35a is a dark state pixel. Similarly, pixel configuration 33h features all three sub-pixels 32a-32c in a bright state, thus the resulting pixel image 35h is a bright state pixel.

Pixel configurations 33b-33g feature sub-pixels in both a dark and bright side, thus resulting in various grey levels. As shown in FIG. 4, the greater the number, or the larger the area, of a sub-pixel in a dark state, the darker the resulting grey level may be. Similarly, the greater the number, or the larger the area, of a sub-pixel in a bright state, the lighter the resulting grey level may be.

It should be appreciated that the sub-pixel system illustrated in FIG. 4 is merely an example. The pixels may feature any number of sub-pixels. Furthermore, any number of pixels in a display system may feature any number of sub-pixels.

To decrease the relaxation time from ±F states to the AF state of an AFLC a kick-back pulse may be used. FIG. 2 illustrates an example of a kick-back pulse. An AFLC device may be addressed with a square pulse to switch to +F or −F state followed by a pulse of reversed polarity which may be shorter and/or of lower absolute amplitude. FIG. 2 illustrates a square pulse 40a followed by a pulse of reversed polarity 40b which comprises a lower absolute amplitude and a shorter time duration as compared to the initial square pulse. The kick-back pulse of FIG. 2 may speed up the back relaxation to the AF state.

SUMMARY

In principle, AFLC materials are well suited as a constituent material in high resolution color displays because of the advantage that grey levels can be produced by simple amplitude modulation using the symmetric hysteresis curve together with a holding voltage. However, AFLCs often have a few features making the grey level generation demanding, for example:

1) without the orthoconic condition AFLC materials seldom permit a well defined dark state leading to a low contrast (highest stated value being 30:1) and few possible grey levels;

2) an imperfect symmetry in the hysteresis will make the grey levels ill-defined, thus combined with the low contrast this might seriously limit the number of grey levels that can be obtained; and 3) the intermediate levels built up of fractions of AF and F domains in the same pixel are often temperature-dependent, which might require temperature compensation in the driving waveforms to control the grey scale.

Thus, example embodiments are presented herein towards improving the driving of antiferroelectric liquid crystal devices. In improving the driving, grey scale generation provided by a liquid crystal device may also be improved. Some of the example embodiments may comprise combining materials working in the orthoconic condition with new driving features made possible by such materials, thereby solving the above mentioned problems and making the grey levels more precise.

Some example embodiments may be directed towards time and amplitude modulation of OAFLC. The well defined black and white states combined with the fast switching of OAFLC enables grey levels to be produced in the time domain. The very high contrast of OAFLC also permits many more grey levels by amplitude modulation with respect to AFLC.

Some example embodiments may be directed towards new driving schemes which may be applied to AFLC or OAFLC based devices. As orthoconic materials provide well-defined black and white states, a new mode for driving becomes possible without using a holding voltage for stabilization of grey levels. In this mode, two states may be used for writing information with grey levels produced in the time domain. Thus, intermediate hysteresis loops need not be used. The use of intermediate non-symmetric hysteresis loops typically result in ill-defined grey levels. Such non-symmetric hysteresis loops are generally experienced in AFLCs as the two substrates are not identical. For example, one substrate may contain a thin-film-transistor array, whereas the other may contain a color filter triad. By avoiding the use of such loops, stable end-points representing the synclinic states (±F or white states) in addition to the anticlinic black state (AF) may be used. Thus, the problems connected to the asymmetry of the hysteresis curve as well as with the temperature dependence may be avoided.

While AFLC prototypes so far have been driven by DC waveforms and holding voltages that have been inverted for every next frame in order to avoid a DC bias, the inventors herein have found that high frequency AC signals permit a new kind of switching, of particular interest for fast back-relaxation to the black state. High frequency signals can also be used for achieving and controlling the written states.

Some of the example embodiments may be directed towards a method for writing greyscale in an antiferroelectric liquid crystal (AFLC) device. The device may comprise two electrode substrates confining an antiferroelectric liquid crystal (AFLC) material. The method may comprise driving the AFLC device with an electrical signal, said electrical signal not comprising a DC holding voltage for a writing of at least a portion of written levels of grey. The method may further comprise inducing a greyscale configuration in the AFLC device as a function of the driving.

The method may also comprise modulating the electrical signal with respect to time.

The method may also comprise utilizing only a dark AF state and bright ±F states.

The method may also comprise modulating the electrical signal with respect to amplitude.

The method may also comprise the two electrode substrates defining at least two sub-pixels and the driving may further comprise modulating the electrical signal with respect to a sub-pixel modulation.

The method may also comprise driving with a high-frequency signal, and switching to a HAF state as a function of the driving.

The method may also comprise driving with a high-frequency signal, and simultaneously stabilizing HAF and F states of the AFLC material as a function of the driving.

The method may also comprise inducing a stable greyscale configuration, wherein the stable greyscale configuration is substantially temperature independent between 25° C.-50° C.

The method may also comprise the AFLC material being an orthoconic AFLC material.

Some example embodiments may be directed towards a liquid crystal device. The device may comprise two electrode substrates confining an antiferroelectric liquid crystal (AFLC) material, said electrode substrates may configured to receive an electrical signal for driving the device and writing greyscale. The electrical signal does not comprise a DC holding voltage for a writing of at least a portion of written levels of grey and the AFLC device may comprise an induced greyscale configuration as a function of the electrical signal.

The device may comprise Orthoconic AFLC material. The device may further be configured for greyscale writing according to any of the steps described above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 2 is an example of a kick-back pulse signal used to speed up the back relaxation to the AF state;

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Some of the example embodiments presented herein provide novel driving schemes for OAFLC and AFLC based devices. Utilizing the examples embodiments presented herein, OAFLC cells with a contrast value of well above 1000:1 may be realized, which permits a high number of possible levels of grey.

An example AFLC material that may be employed is the orthoconic mixture W182 or W193B, which may be provided from the Dabrowski research group in Warsaw. The phase sequence of W182 is $SmC^*_A$–99° C.–$SmC^*$–115° C.–5 mA–120° C.–Iso.

An example illustration of W182 is provided below, where $P_1$ and $P_2$=1 and 2, or 2 and 1, respectively, and n is an integer. It should be appreciated that $P_1$ and $P_2$ may take any value such that $P_1+P_2$=3. W182 and W193 are both mixtures of different molecules according to this formula.

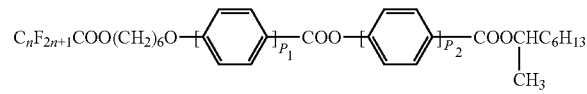

The well defined dark and bright states, combined with the fast switching of OAFLC, permits grey levels to be created in, for example, the time domain. Thus, some example embodiments may provide grey levels through the use of time modulation. By switching the cell, or pixel, to the fully bright ±F states a fraction of the total timeframe, a lower amount of light may pass through the device compared to switching it for a duration of the entire timeframe, resulting in a darker appearance. By altering the fraction of the bright states, different levels of grey may be produced. Furthermore, by using both +F and −F states an effective and straightforward DC compensation may be utilized. In contrast, time modulation used in i.e. FLC devices today requires, due to their single bright state, a DC compensation driving that seriously limits the transmission of a device.

According to some of the example embodiments, a voltage may be applied to the OAFLC or AFLC cell, followed by the same voltage of the reversed polarity. The amount of time the voltage is applied during each frame may be modulated resulting in different possible grey levels. The use of time modulation may provide a means of driving AFLC and/or OAFLC devices without the use of a holding voltage or utilization of the hysteresis curve.

Figure 1B:
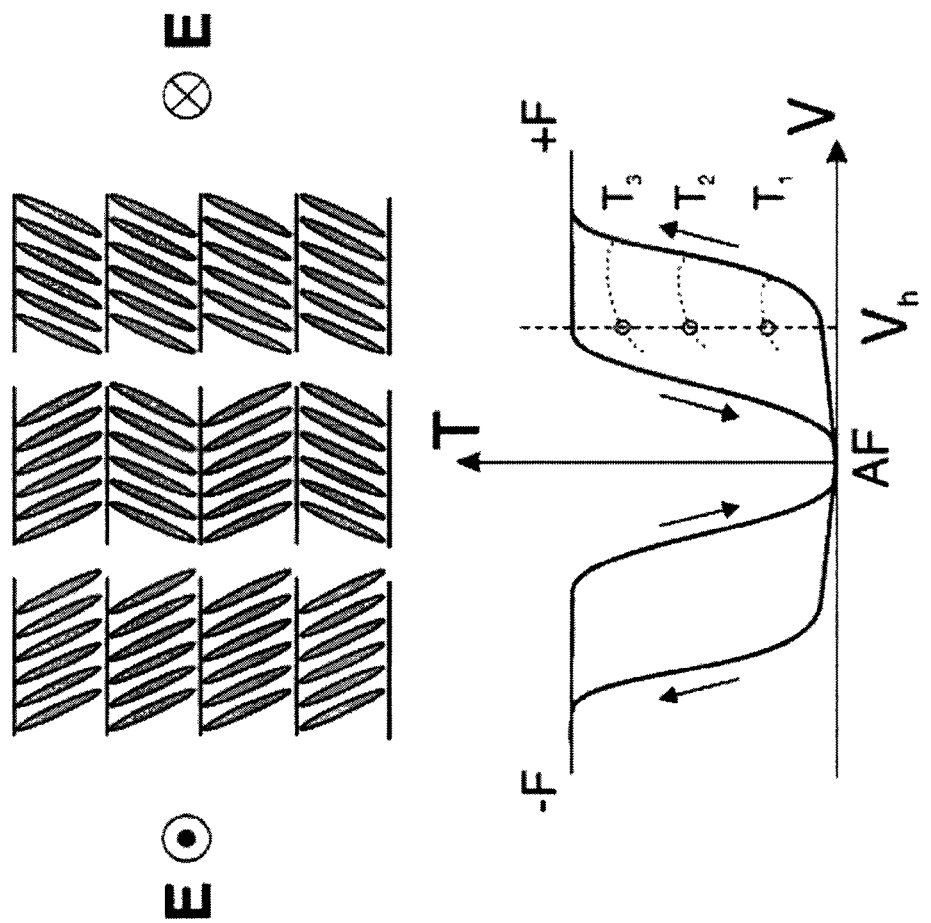
FIG. 1B is an illustrative example of the switching and electro-optic characteristics of the cell of FIG. 1A.
Figure 1A:
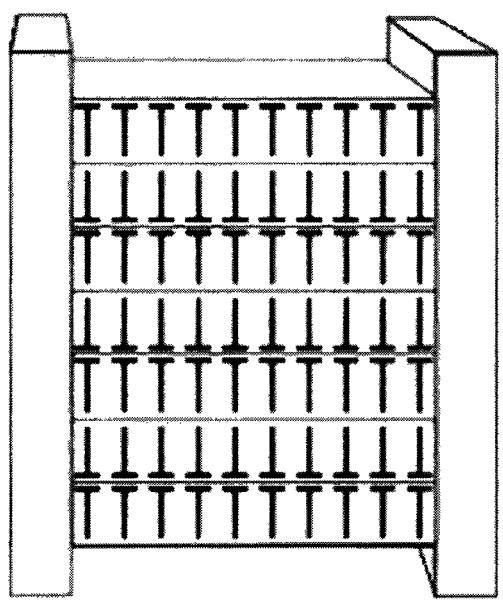
FIG. 1A is an illustrative example of the geometry properties of an antiferroelectric liquid crystal cell in the HAF state.
Figure 3:
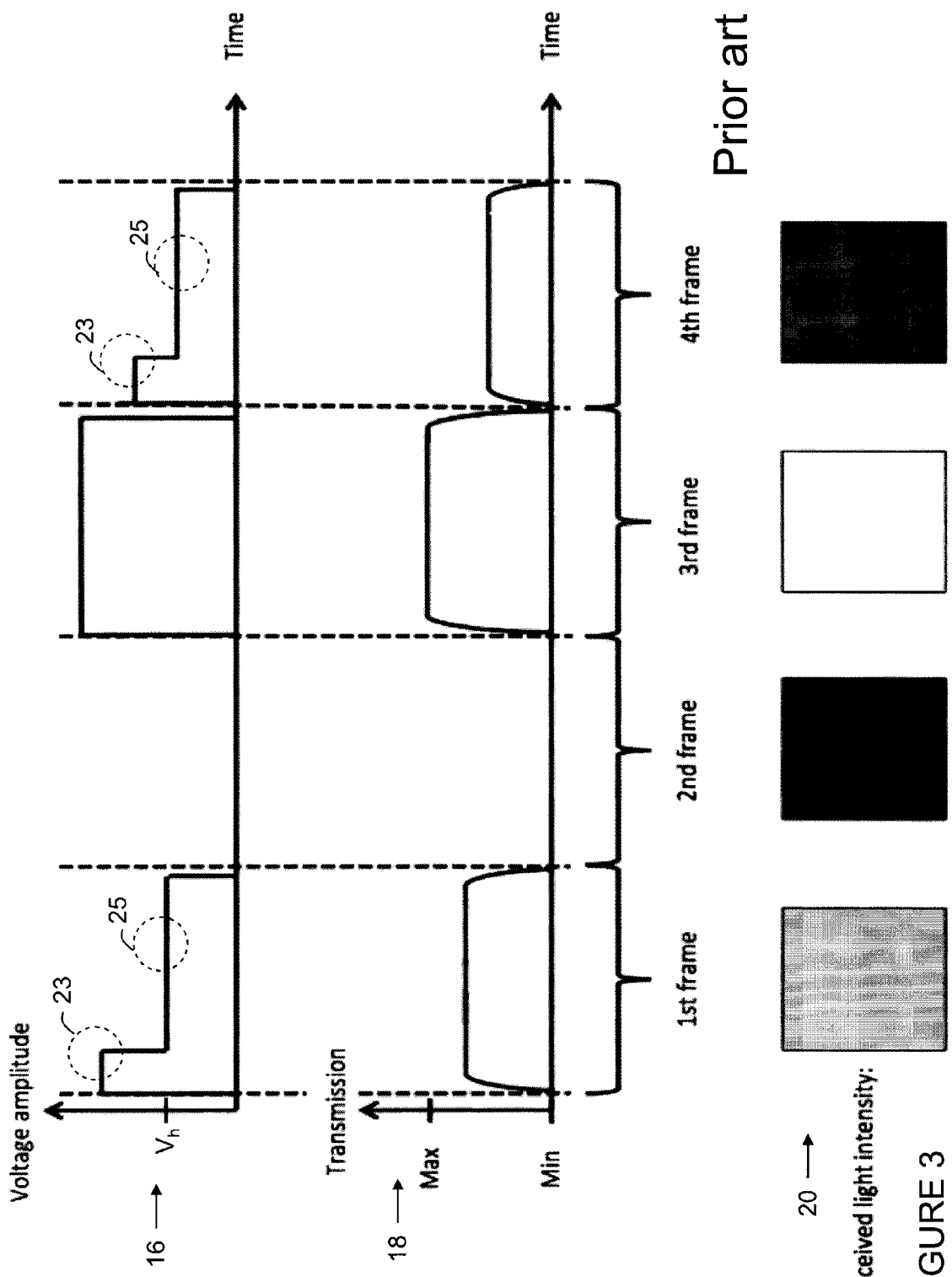
FIG. 3 is an illustrative example of greyscale production through the use of amplitude modulation.
Figure 4:
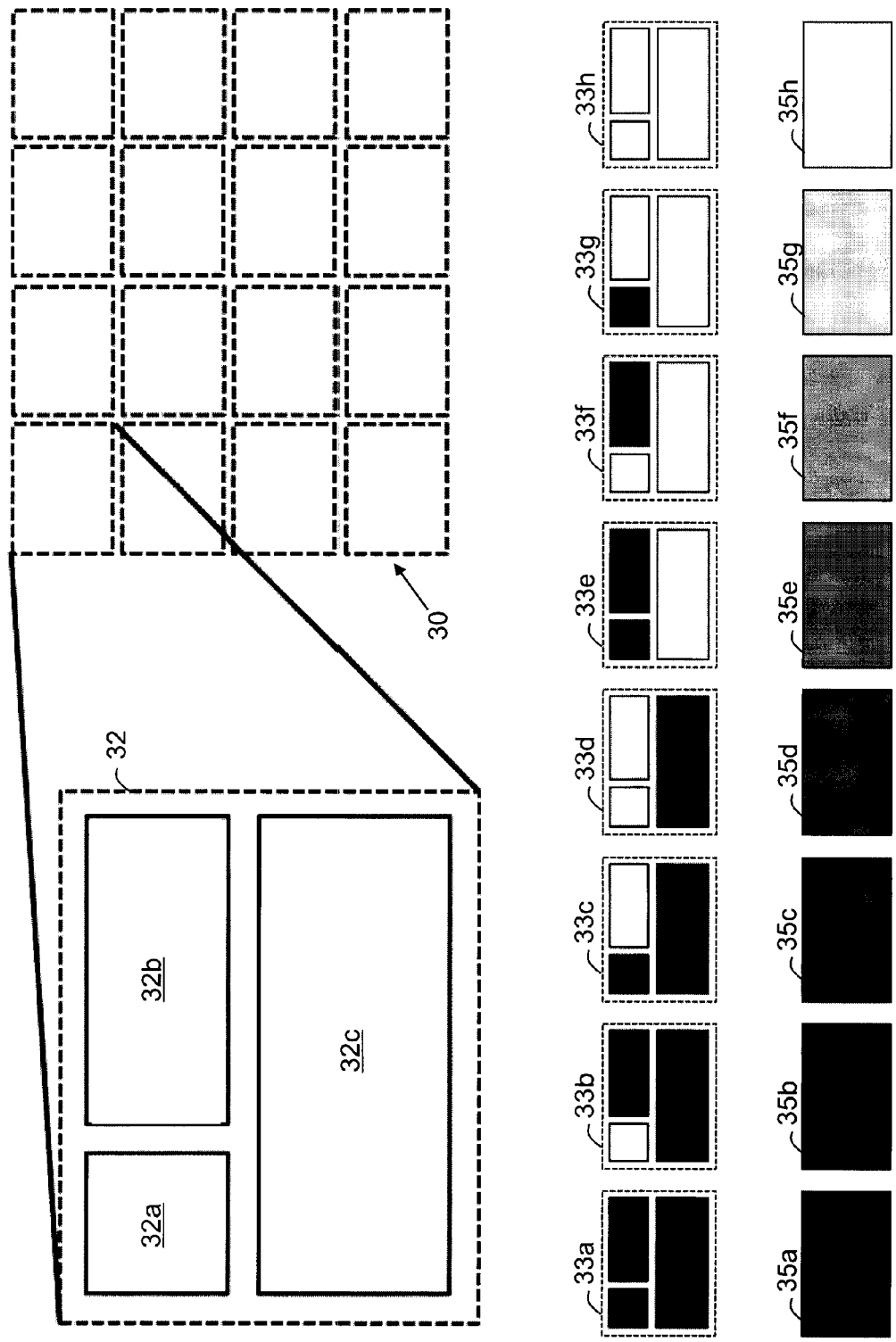
FIG. 4 is a schematic of a sub-pixel system utilizing sub-pixel modulation.
Figure 5:
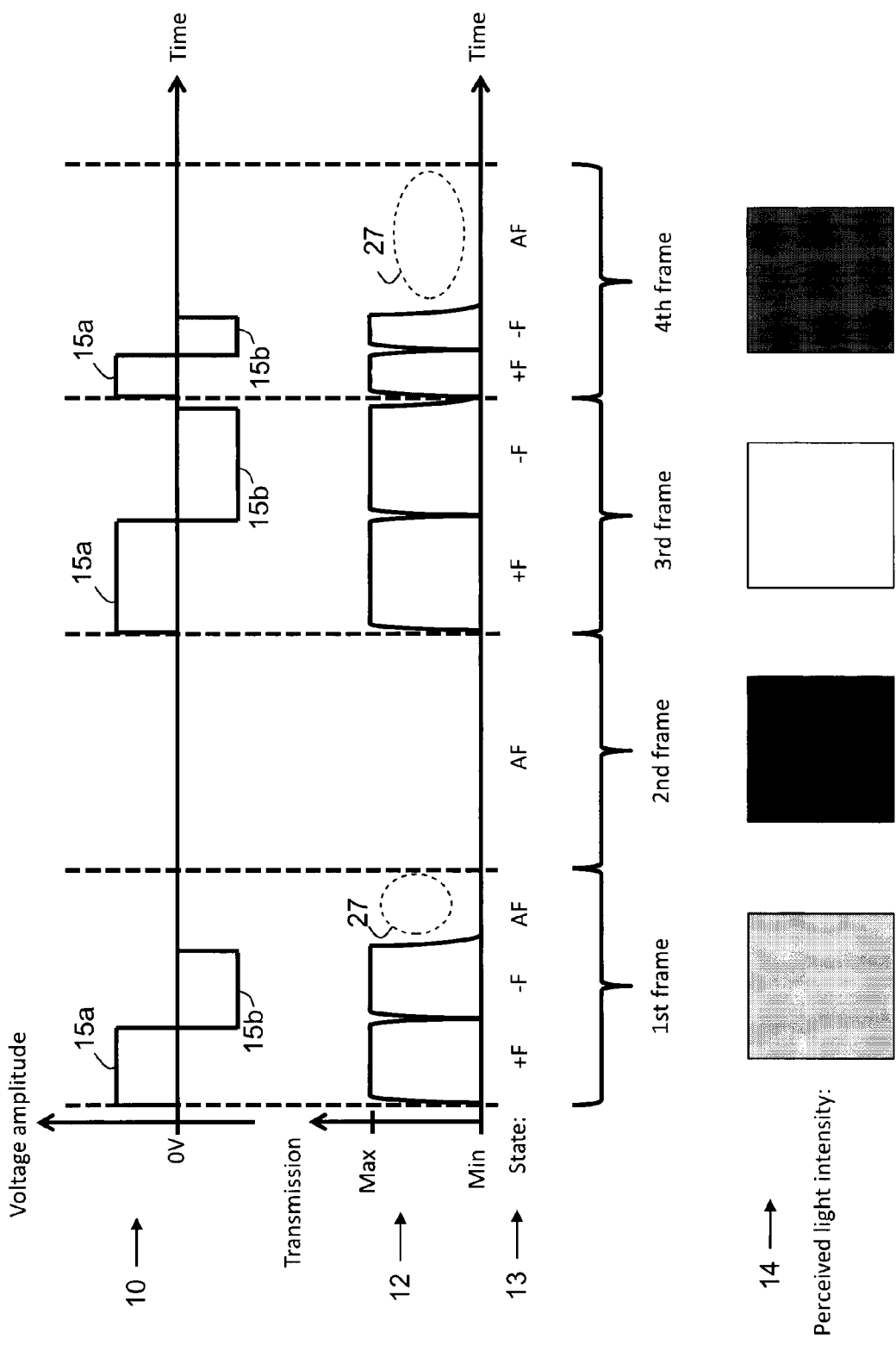
FIG. 5 is an illustrative example of greyscale production through the use of time modulation, according to some of the example embodiments.

An illustrated example of grey levels produced by time modulation without the use of holding voltage is shown in FIG. 5. FIG. 5 illustrates a graphical representation of an applied voltage amplitude versus time for four frames 10. FIG. 5 also illustrates the perceived light intensity as a result of the applied voltage for each of the four frames 14. FIG. 5 also illustrates the AFLC state 13 versus voltage amplitude.

Frame 3 depicts the production of a bright state, where a voltage resulting in a high level of transmission, with no modulation, is applied. Frame 2 depicts the production of a dark state with the application of a minimal or near zero voltage resulting in no or minimal transmission, with no modulation applied.

Frames 1 and 4 depict grey levels produced without the use of a holding voltage. Only the dark AF state 13 and the two bright ±F states 13 are used for producing the grey level by time modulation. As illustrated, a voltage or electrical pulse 15a, and a corresponding voltage or electric pulse with reversed polarity 15b, is applied for only a portion of the entire frame duration. There is a period of non-transmission 27 in each of the frames 1 and 4. The longer the period of non-transmission 27, the darker the produced grey level may be. It should be appreciated that some example embodiments may comprise solely utilizing the dark AF and bright ±F states, as shown in FIG. 5.

Thus, according to some example embodiments, an AFLC or OAFLC based device may be electronically driven with a signal which does not comprise a DC holding voltage for a writing of at least a portion of written levels of grey. Specifically, a DC holding voltage is not utilized for the writing of all displayed levels of grey.

According to some example embodiments a novel way of addressing the OAFLC or AFLC device may comprise a square pulse to switch to +F or −F state followed by a pulse of reversed polarity which may be shorter and/or of lower absolute amplitude followed by a high frequency (HF) signal. Such a signal may speed up the back relaxation from F to AF.

Figure 6:
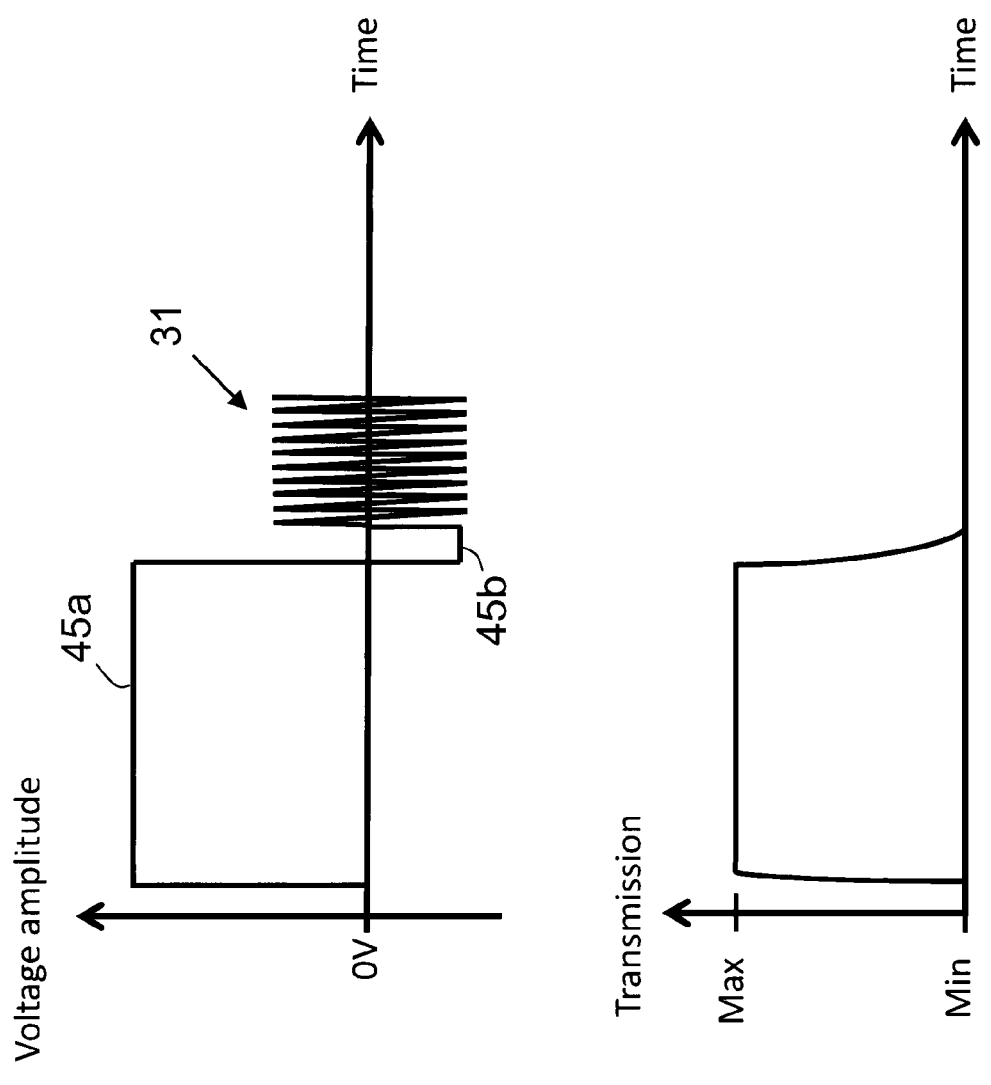
FIG. 6 is an illustrative example of a reversed polarity signal with a high-frequency pulse, according to some of the example embodiments.

FIG. 6 illustrates a square pulse 45a followed by a pulse of reversed polarity 45b which comprises a lower absolute amplitude and a shorter time duration as compared to the initial square pulse. Following the reversed pulse is a tail in form of a high-frequency signal 31, for example in the order of 100 kHz, which may be applied to further stabilize the HAF state. The high-frequency signal may help the HAF state become instantly stabilized, hence the back relaxation time to HAF may be even further decreased. Specifically, the negative pulse may actively cause the molecules of the AFLC to move around the smectic cone about a quarter turn around the cone when the reversed polarity pulse ends and the intrinsic relaxation of the AF state begins. Applying a HF signal, for example when the intrinsic relaxation begins, may speed up the back relaxation to the helix free HAF state and especially the orthoconic HAF state.

Figure 7:
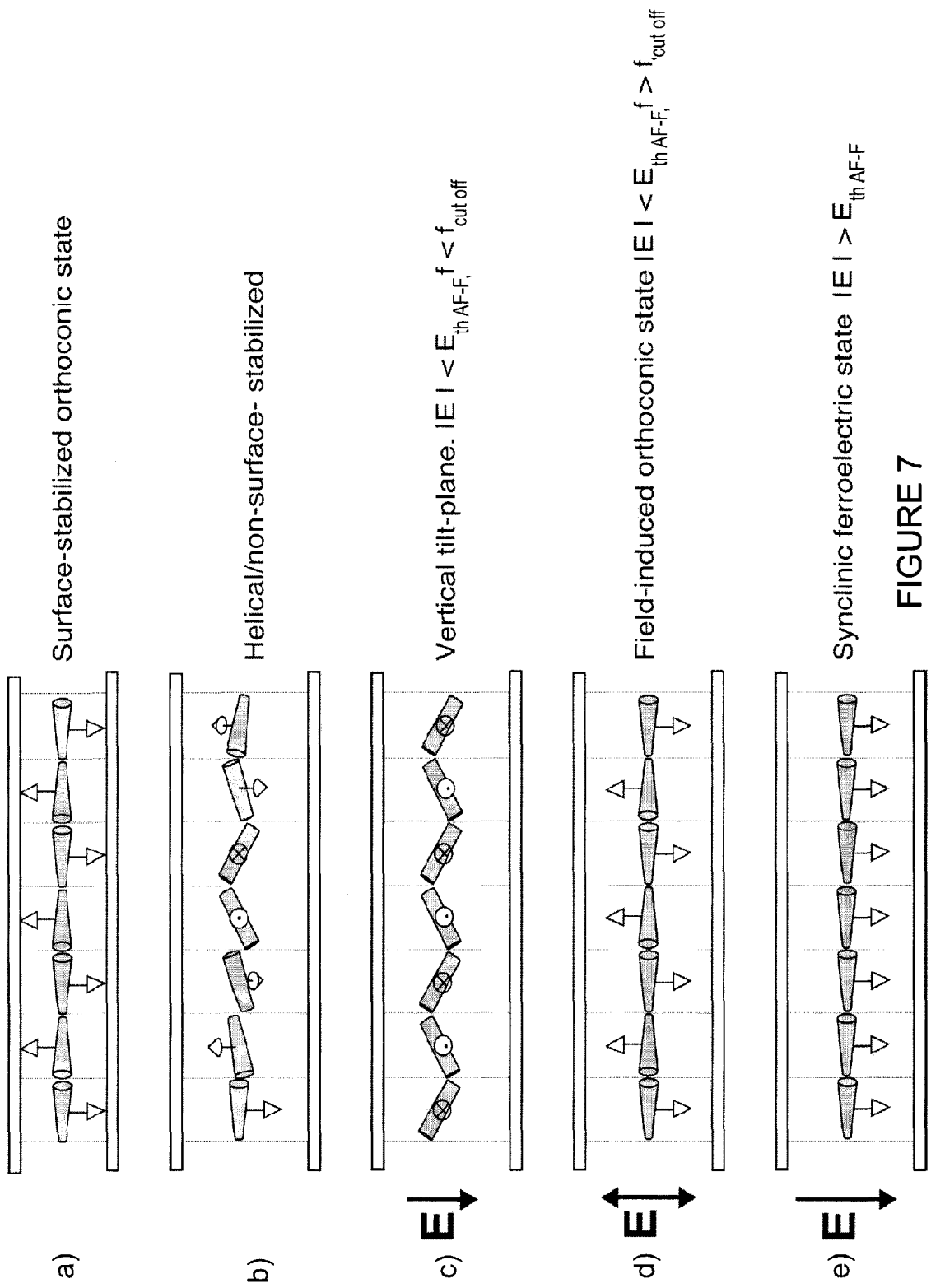
FIG. 7 depicts illustrative examples of the effects of an induced electric field in an antiferroelectric liquid crystal cell; illustration c) exemplifies the action of a low frequency (LF) field; illustration d) exemplifies the action of a high frequency (HF) field.

It should be appreciated that the application of the high-frequency signal also assists in stabilizing the helix free state in a AFLC material. It is the dielectric torque of the high-frequency signal that may be utilized in stabilizing the anti-ferroelectric (AF) state (e.g., the helix-free HAF state). FIG. 7 depicts the effects of an induced electric field on an AFLC cell with the use of example illustrates a)-e). Example illustration a) depicts a purely surface-stabilized orthoconic AFLC cell with no electric field present. The material shown in illustration a) fulfills the long pitch condition (e.g., the helix pitch is large compared to the cell gap d and structure of the AFLC is unwound). Example illustration b) depicts a cell in which the long pitch condition is not fulfilled. Thus the material adopts a helical (non-surface stabilized) configuration. The loss of the long pitch condition may be caused by, for example, temperature changes.

Example illustration c) depicts an applied electric field below the cut-off frequency (which may be in the order of 100 kHz) for antiphase motion. The application of such a field may result in an AFLC device with an unwound helix structure due to the torque on the net polarization ($P_{net}$) and the tilt plane may be aligned parallel to the applied field.

Example illustration d) depicts the AFLC cell where high frequencies of the field ($f \leq f_{cut\ off}$) are applied. The resulting device of illustration d) may comprise a non-polar dielectric torque which may dominate over the torque on $P_{net}$ and the tilt-plane may therefore align perpendicular to the field. This is a high frequency induced horizontal orthoconic state.

Example illustration e) depicts the application of a high frequency field ($f \leq f_{cut\ off}$). The resulting AFLC cell may comprise the characteristics of the cell shown in example illustration d), and the cell may also be in a synclinic ferroelectric state. Importantly, the HF field stabilizes both the helix-free HAF and the helix-free synclinic states with the director parallel to the cell plane.

At high frequencies, where the dielectric properties are governed by the dielectric anisotropy, the regions where the tilt plane is perpendicular to the field may grow and at a high enough field the helix may be completely unwound with the plane of the director perpendicular to the field direction. This represents the same optical state as a surface-stabilized orthoconic AFLC cell. One important difference is that with the application of the high-frequency field, the orthoconic state is field-induced. Thus, a high-frequency field may also be utilized to turn the director-plane of the anticlinic $SmC_a^*$ structure to be perpendicular to the applied field, regardless of the initial position of the tilt plane in a bookshelf type cell.

According to some example embodiments a novel type of electronic addressing of OAFLC and AFLC devices may comprise a switching from AF to F by for example a DC-pulse. An HF field may thereafter be applied, possibly on the whole device, which may stabilize the written state of essentially all pixels, both the dark state as well as the two bright states. When the HF field is removed the relaxation to AF may occur. After relaxation to AF the HF field may be applied again to stabilize the helix free anticlinic state.

It should be appreciated that in some example embodiments the writing of greyscale may be stable and substantially temperature independent between 25° C.-50° C. In other words, during the provided temperature range, utilizing the same driving signal may yield the same grey level, thus providing a stable greyscale regardless of temperature. This may be provided by the exclusion of a DC holding voltage for a writing of at least a portion of written levels of grey.

The foregoing description of the example embodiments have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. Furthermore, the illustrations provided herein are schematics and are not drawn to scale. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another. Furthermore, it should be appreciated that the example embodiments presented herein may also be used in conjunction with prior art methods for writing greyscale.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some example embodiments may comprise a portable or non-portable telephone, media player, Personal Communications System (PCS) terminal, Personal Data Assistant (PDA), laptop computer, palmtop receiver, camera, television, and/or any appliance that comprises a transducer designed to transmit and/or receive radio, television, microwave, telephone and/or radar signals.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for writing greyscale in an orthoconic antiferroelectric liquid crystal (OAFLC) device, said device comprising two electrode substrates confining an orthoconic antiferroelectric liquid crystal (OAFLC) material, the method comprising:
    driving the OAFLC device with an electrical signal, said electrical signal not comprising a DC holding voltage for a writing of at least a portion of written levels of grey, the at least a portion of written levels of grey being produced in a time domain; and
    inducing a greyscale configuration in the OAFLC device as a function of the driving.

2. The method of claim 1 wherein the driving further comprises modulating the electrical signal with respect to time.

3. The method of claim 2, wherein the modulating further comprises utilizing only a dark AF state and bright ±F states.

4. The method of claim 1, wherein the driving further comprises modulating the electrical signal with respect to amplitude.

5. The method of claim 1, wherein the two electrode substrates define at least two sub-pixels and the driving further comprises modulating the electrical signal with respect to a sub-pixel modulation.

6. The method of claim 1, wherein the driving further comprises driving with a high-frequency signal, and switching to a HAF state as a function of the driving.

7. The method of claim 1, wherein the driving further comprises driving with a high-frequency signal, and simultaneously stabilizing HAF and F states of the OAFLC material as a function of the driving.

8. The method of claim 1, wherein the inducing further comprises inducing a stable greyscale configuration, wherein the stable greyscale configuration is substantially temperature independent between 25° C.-50° C.

9. A liquid crystal device, the device comprising:
    two electrode substrates confining an orthoconic antiferroelectric liquid crystal (OAFLC) material, said electrode substrates being configured to receive an electrical signal for driving the device and writing greyscale, said electrical signal not comprising a DC holding voltage for a writing of at least a portion of written levels of grey, the at least a portion of written levels of grey being produced in a time domain; and
    wherein the OAFLC device comprises an induced greyscale configuration as a function of the electrical signal.

10. The liquid crystal device of claim 9, wherein the two electrode substrates are further configured to receive an electrical signal modulated with respect to time.

11. The liquid crystal device of claim 10, wherein the electrical signal is modulated such that only a dark AF state and bright ±F states of the OAFLC material is utilized.

12. The liquid crystal device of claim 9, wherein the electrical signal is modulated with respect to amplitude.

13. The liquid crystal device of claim 9, wherein the two electrode substrates define at least two sub-pixels and the electrical signal is modulated with respect to a sub-pixel modulation.

14. The liquid crystal device of claim 9, wherein the electrical signal is a high-frequency signal such that the OAFLC material is switched to a HAF state as a function of the electrical signal being applied.

15. The liquid crystal device of claim 9, wherein the electrical signal is a high-frequency signal, which is provided such that the OAFLC material is simultaneously stabilized in HAF and F states of the OAFLC material as a function of the electrical signal being applied.

16. The liquid crystal device of claim 9, wherein the induced greyscale configuration is a stable greyscale configuration, wherein the stable greyscale configuration is substantially temperature independent between 25° C.-50° C.

* * * * *